United States Patent [19]

Aarts et al.

[11] Patent Number: 4,681,281
[45] Date of Patent: Jul. 21, 1987

[54] RECORDING AND/OR REPRODUCING APPARATUS

[75] Inventors: Petrus J. J. Aarts, Perchtoldsdorf; Alois Huber, Vienna, both of Austria

[73] Assignee: U.S. Philips Corporation, New York, N.Y.

[21] Appl. No.: 832,288

[22] Filed: Feb. 21, 1986

[30] Foreign Application Priority Data

Feb. 27, 1985 [AT] Austria ............................ 581/85

[51] Int. Cl.⁴ .................... G03B 1/04; G11B 15/32
[52] U.S. Cl. .................................. 242/200; 360/96.3
[58] Field of Search .............. 242/201, 200, 204, 205, 242/71.6; 360/96.3, 96.4, 90

[56] References Cited

U.S. PATENT DOCUMENTS

| 3,495,789 | 2/1970 | Gerfast | 242/201 |
| 3,809,336 | 5/1974 | Kollar et al. | 242/204 X |
| 3,894,702 | 7/1975 | Okano | 242/201 |
| 4,018,518 | 4/1977 | Wright | 242/200 X |
| 4,252,284 | 2/1981 | Suzuki | 242/201 |
| 4,330,098 | 5/1982 | Santoro | 242/201 |

Primary Examiner—John M. Jillions
Attorney, Agent, or Firm—F. Brice Faller

[57] ABSTRACT

A recording and/or reproducing apparatus (1) for a magnetic tape includes two winding spindles (13, 14) for driving winding hubs (9, 10) mounted coaxially thereon and a drive mechanism (15) for driving the winding spindles (13, 14). The drive mechanism (15) comprises a first drive wheel (46) which is selectively drivable in one of two directions of rotation and which drives a second drive wheel (48) via a coupling device (49), which second drive wheel can be coupled to one of the two winding spindles (13, 14) depending on its direction of rotation. The coupling device (49) comprises two friction couplings (51, 53) arranged coaxially between the first and second drive wheels and adapted to transmit different torques. A unidirectional coupling (55) bypasses the friction coupling (53) for the transmission of the smaller torque in the case of a direction of rotation (56) so that the device transmits different torques in opposite directions of rotation. By means of this drive mechanism (15) the two winding spindles (13, 14) can be driven with different torques, so that the torques of the winding spindles (13, 14) are adapted to the different friction effects on the magnetic tape (11) when this tape is wound on the winding hub (9) and the winding hub (10).

3 Claims, 5 Drawing Figures

RECORDING AND/OR REPRODUCING APPARATUS

BACKGROUND OF THE INVENTION

The invention relates to a recording and/or reproducing apparatus tape which can be driven selectively in one of two directions of transport between two rotatable winding hubs. Two rotatable winding spindles for driving the two winding hubs are coaxially mounted on the spindles and take up the tape in conformity with the selected direction of transport. A drive mechanism for driving the winding spindles has a first drive wheel which can be rotated in one of the two directions of rotation by a motor and a second drive wheel which is rotatable relative to and coaxial with the first drive wheel. The second drive wheel can be rotated by the first drive wheel via a coupling device comprising two friction couplings to drive one of the two winding spindles depending on its direction of rotation.

Such an apparatus is disclosed in EP-A-No. 0,079,053 to which U.S. Pat. No. 4,499,512 corresponds. In this known apparatus each of the two friction couplings, which are constructed as felt-disc couplings, always cooperate with a radial surface of the first drive wheel, one of the two friction couplings always cooperating with a radial surface of the second drive wheel and the other friction coupling always cooperating with a radial surface of a spring-loaded pressure disc which is fixed to the second drive wheel. In both directions of rotation of the first drive wheel the two friction couplings therefore always operate simultaneously and parallel. The provision of two friction couplings operating with parallel forces ensures that a comparatively large torque can be transmitted with a comparatively smooth coupling characteristic. However, as the two friction couplings operate simultaneously for both directions of rotation they are only capable of transmitting one specific torque to the second drive wheel and hence to the two winding spindles for both directions of rotation.

However, it is often required to drive the two winding spindles with different torques in order to compensate for the different friction effects of the guide means and scanning elements on the record carrier and the resulting difference in tape tension when the record carrier is wound onto the two winding hubs in each of its two possible directions of transport. For this purpose each winding spindle may be driven via a separate coupling device comprising at least one friction coupling, enabling different torques to be transmitted by means of these two separate coupling devices. However, the use of separate coupling devices is unfavourable in view of costs and the required space.

SUMMARY OF THE INVENTION

It is the object of the invention to provide a simple way of driving the two winding spindles with different torques via a single coupling device in an apparatus of the type defined in the opening paragraph. To this end an idler wheel is arranged coaxially between the two drive wheels so as to be rotatable relative to the drive wheels, the first drive wheel being coupled to the idler wheel via one of the two friction couplings and the idler wheel being coupled to the second drive wheel via the other friction coupling. The two friction couplings of the coupling device are adapted to transmit different torques, and the coupling device comprises a unidirectional coupling by means of which in one of the two directions of rotation of the first drive wheel the drive wheel, which is coupled to the idler wheel via the friction coupling which transmits the smaller torque, can be coupled to the idler wheel so as to bypass said friction coupling. In this way it is achieved that in one direction of rotation of the first drive wheel the friction coupling for the smaller torque is bypassed by the unidirectional coupling which is now operative and that the friction coupling for the larger torque slips, so that in this direction of rotation the torque transmitted by the coupling device is determined by the friction coupling which transmits the larger torque. In the opposite direction of rotation of the first drive wheel the unidirectional coupling, which is now disengaged, allows the friction coupling for the smaller torque to slip, so that this friction coupling transmits the rotation and in this opposite direction of rotation the torque transmitted by the coupling device is defined by the friction coupling for the transmission of the smaller torque and is consequently smaller. Thus each of the two winding spindles can be driven with a different torque in a very simple way, to provide compensation for different friction effects on the tape and the resulting differences in tape tension arising when the record carrier is wound onto the winding hubs in each of the two possible directions of transport. The first drive wheel may then be coupled to the idler wheel via the friction coupling for the transmission of the larger torque and this idler wheel may be coupled to the second drive wheel via the friction coupling for the transmission of the smaller torque, i.e. via the unidirectional coupling. However, it is alternatively possible to interchange the two couplings, in which case the first drive wheel is coupled to the idler wheel via the friction coupling for the transmission of the smaller torque, i.e. via the unidirectional coupling, and the idler wheel is coupled to the second drive wheel via the friction coupling for the transmission of the larger torque.

The friction couplings may be constituted by torsion-spring couplings and the unidirectional coupling by a ratchet coupling. However, it is found to be advantageous if each of the two friction couplings is constituted by a felt-disc coupling comprising an annular felt disc and the unidirectional coupling is constituted by a clamping-body freewheel coupling which embraces the circumference of the felt-disc coupling for the transmission of the smaller torque. This results in a particularly simple, cheap and compact coupling device, which requires a minimal space in the apparatus.

The two felt-disc couplings for transmitting different torques may comprise felt-discs of equal size made of felt materials having different coefficients of friction. However, in such a case steps should be taken in order to ensure that the felt discs cannot be interchanged when the coupling device is assembled, as this would result in malfunctioning of the coupling device. Therefore, if the annular felt discs of the two felt-disc couplings are made of the same felt material and have at least different outer diameters or inner diameters. In this way two felt-disc couplings for transmitting different torques are obtained in a simple way, because the annular felt discs of the same material have different average diameters corresponding to the torques to be transmitted, and in addition the different dimensions preclude interchanging of the felt discs during assembly of the coupling device.

DETAILED DESCRIPTION OF THE INVENTION

Figure 1:
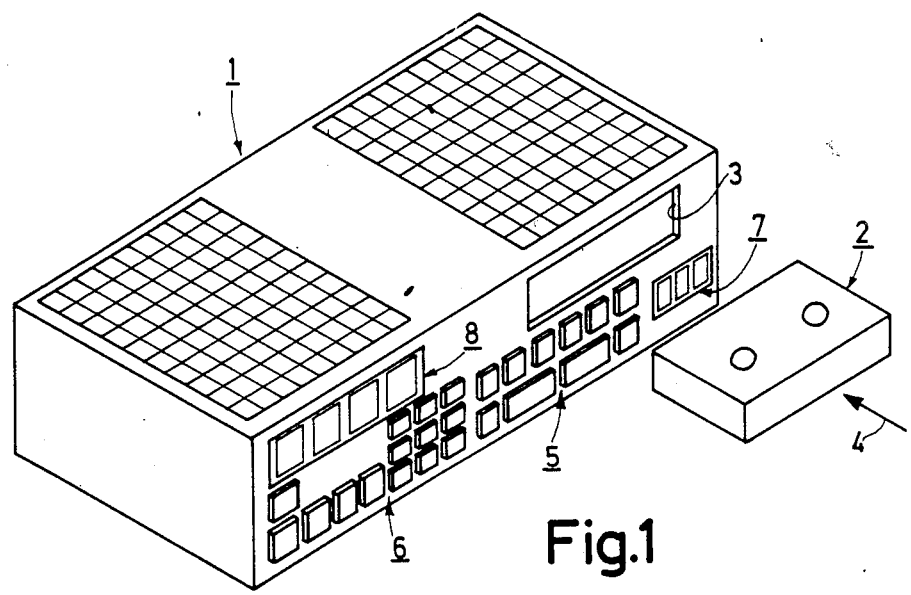
FIG. 1 is a schematic perspective of the apparatus.

FIG. 1 shows apparatus 1 for recording and/or reproducing television signals and audio signals on/from a magnetizable record carrier in the form of a tape, referred to hereinafter as a magnetic tape. The magnetic tape is accommodated in a cassette 2, in which it extends between two juxtaposed winding hubs, which cassette can be inserted into the apparatus through an opening 3 in the direction indicated by the arrow 4. The cassette 2 is inserted into a movable cassette holder by means of which, after complete insertion into the apparatus, the cassette is lowered substantially perpendicularly to the major walls of the cassette into an operating position which is shown schematically in FIG. 2. For starting the modes of operation of the apparatus, such as "recording", "normal forward play", "normal reverse play", "fast forward winding", "fast reverse winding", "still reproduction" etc. the apparatus 1 comprises a first set 5 of controls. For programming the apparatus and entering further data, for example setting a day timer, the apparatus 1 has second set 6 of controls. Further the apparatus has two display units 7 and 8, which have seven segments each and which serve for displaying the count of a tape-length counter and for indicating the time.

Figure 2:
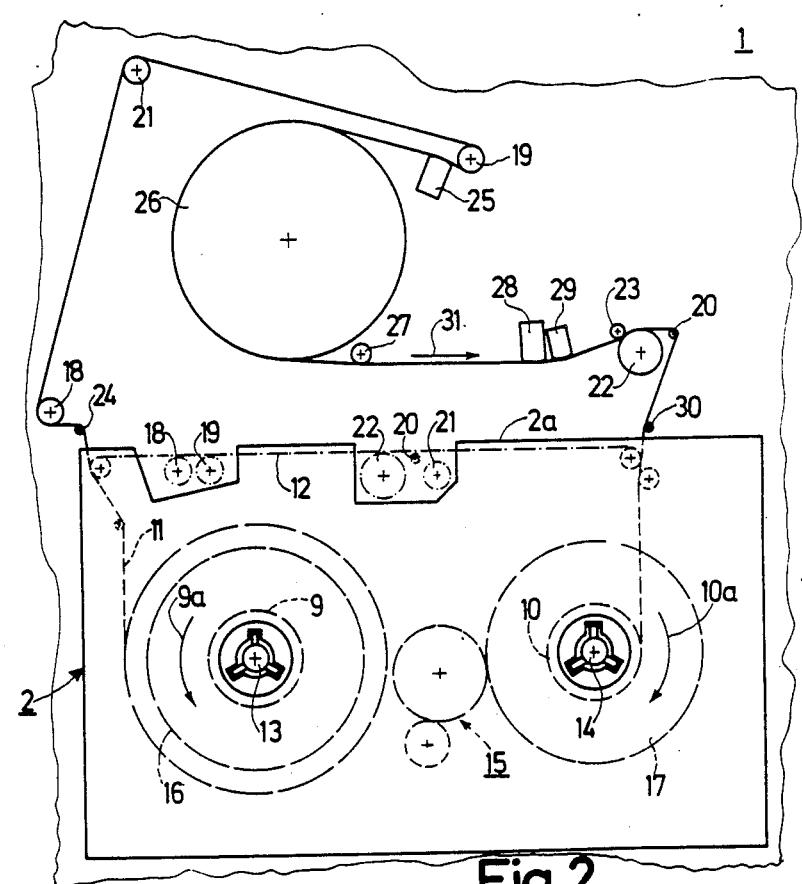
FIG. 2 is a partial schematic view of the apparatus with the tape, withdrawn from the cassette and wrapped around guide and scanning elements.

Referring to FIG. 2, two winding spindles 13 and 14 are coupled with the two juxtaposed rotatable winding hubs 9 and 10 between which the magnetic tape 11 extends inside the cassette 2 along a path which is partly indicated by a dashed-dot line 12. The magnetic tape is wound onto the hubs in conformity with the direction of tape transport in opposite winding directions as is indicated by the means of the arrows 9a and 10a, so that the winding hubs 9 and 10 can be rotated by the winding spindles 13 and 14 on which they are mounted coaxially. It is obvious that the winding spindles may be of another construction and may each have a centrally arranged positioning mandril for positioning a winding hub and a drive spindle for driving a winding hub which is off-center relative to the first-mentioned hub. For driving the two winding spindles 13 and 14 there is provided a drive mechanism 15, which can be coupled selectively to one of the two reel supports 16 and 17 which are rigidly connected to the winding spindles 13 and 14, as will be described in more detail hereinafter.

When the cassette is lowered into its operating position a cassette cover, not shown, at the front 2a of the cassette is opened, so that a cassette opening in the front 2a is exposed and four tape guides 18, 19, 20 and 21 and a pressure roller 22, which are then in their rest position shown in dashed-dot lines, penetrate two openings in the cassette 2 to engage behind the part of the magnetic tape 11 represented by the dashed-dot lines 12. After the cassette has been lowered into its operating position the tape guides 18, 19, 20 and 21 can be moved to their operating positions shown in full lines in FIG. 2, and the pressure roller 22 can also be moved to an intermediate position, not shown, near the capstan 23. The magnetic tape is then withdrawn from the cassette 2 through the opening in the front 2a of the cassette. From its intermediate position the pressure roller 22 can be set to its operating position shown in FIG. 2, in which position it presses the magnetic tape 11 against the capstan 23.

After the tape guide means 18, 19, 20 and 21 and the pressure roller 22 have been set to their operating positions the magnetic tape 11 extends along the path shown in full lines in FIG. 2. The magnetic tape then extends from the winding hub 9 to the winding hub 10 via two tape guides arranged inside the cassette, a tape-tension sensor 24, the movable tape guides 18, 21 and 19, a stationary magnetic head 25 for erasing all the signals recorded on the magnetic tape, a drum-shaped scanning unit 26, the rotatable magnetic heads for recording and reproducing television signals in/from adjoining video tracks which are inclined relative to the longitudinal direction of the magnetic tape, a stationary tape guide 27, a stationary magnetic head 28 for erasing audio signals in an audio track which extends in the longitudinal direction of the magnetic tape, a further stationary magnetic head 29 for recording and reproducing audio signals in/from the audio track and for recording and reproducing synchronizing signals in a synchronization track which extends in the longitudinal direction of the magnetic tape and parallel to the audio track, the capstan 23, against which the magnetic tape 11 is pressed by the pressure roller 22, the movable tape guide 20, a stationary tape guide 30 and two further tape guides arranged inside the cassette.

The capstan 23, which is connected to a flywheel, not shown, in the customary manner, can be driven with a constant speed in one of the two directions of rotation. When the pressure roller 22 is applied to the capstan 23 the magnetic tape 11 can thus be driven with constant speed in one of two opposite directions. When the capstan 23 is driven in the anticlockwise direction with a predetermined speed the magnetic tape 11 will be driven in the direction indicated by the arrow 31, corresponding to the "normal forward" mode in which the signals are recorded and reproduced in the normal way. When the capstan 23 is driven with the same speed but in a clockwise direction the magnetic tape 11 is driven in a direction opposite to that indicated by the arrow 31, corresponding to "normal reverse" operation, also referred to as "reverse" operation, during which the television signals are reproduced so as to reverse all movements in the picture.

Figure 3:
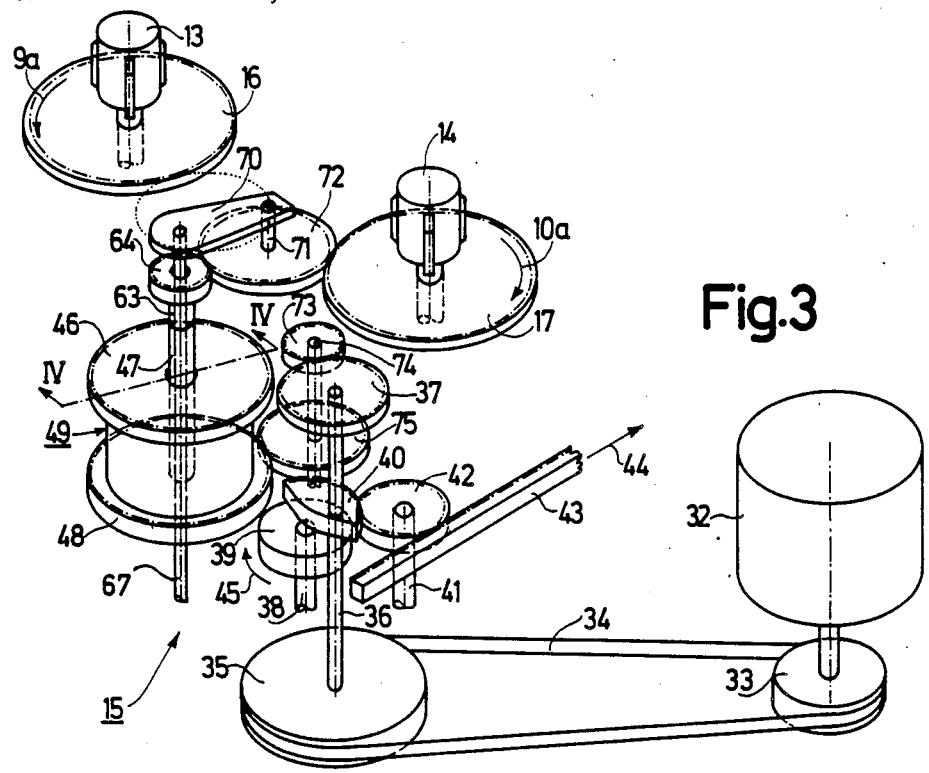
FIG. 3 is a schematic exploded view of the drive mechanism.

If in the "normal forward" mode the capstan 23 drives the magnetic tape 11 in the direction indicated by the arrow 31 the drive mechanism 15 is coupled to the reel support 17 to drive the winding spindle 14 and hence the winding hub 10 in order to wind the magnetic tape 11 onto the winding hub 10, as shown in FIGS. 2 and 3. If in the "reverse" mode the capstan 23, drives the magnetic tape 11 in the direction opposite to that indicated by the arrow 31, the drive mechanism 15 is coupled to the reel support 16 to drive the winding spindle 13 and hence the winding hub 9 in order to wind the magnetic tape 11 onto the winding hub 9, as is indicated by a dotted line in FIG. 3. In the present apparatus the friction to which the part of the tape between the capstan 23 and the winding hub 10 is subjected in the "normal forward" mode and the friction to which the part of the tape between the capstan 23 and the winding hub 9 is subjected in the "reverse" mode are not the same. This is because only four tape guides cooperate with the first-mentioned part of the tape and seven tape guides, three stationary magnetic heads and the drum shaped scanning device cooperate with the last-mentioned part of the tape. In order to ensure that the magnetic tape is wound correctly onto the relevant winding hub with minimal power it is advantageous to drive the winding spindle 14 with a predetermined first torque in the "normal forward" mode and to drive the winding spindle 13 with a predetermined second torque, which is larger than the first torque, in the "reverse" mode, in order to compensate for the different tape loads. This is accomplished in a simple way by means of the drive mechanism 15.

In the "fast forward" and "fast reverse" modes, the pressure roller 22 may be set to its intermediate position, but the movable tape guides 18, 19, 20 and 21 are retained in their operating positions. However, by suitably positioning the movable tape guides 18, 19, 20 and 21 and the pressure roller 22 the magnetic tape can also be wound back completely into the cassette, in which case the tape extends as is indicated by the line 12. During winding the magnetic tape is practically always subjected to the same frictional forces independently of the direction of transport of the magnetic tape, so that in both modes the winding spindles 13 and 14 may be driven with the same torque. In these two modes the two winding spindles 13 and 14 can also be driven by the drive mechanism 15, which is coupled to the reel support 17 in the "fast forward" mode and to the reel support 16 in the "fast reverse" mode, which will also be described hereinafter.

Referring to FIG. 3 drive mechanism 15 comprises a reversible motor 32 which drives a first pulley 33, a second pulley 35 via a belt 34, and a switching wheel 37 via a spindle 36. The spindle 36 is mounted for rotation through a wheel 39 which is pivotable about a spindle 38, the spindle 36 being disposed eccentrically of the spindle 38. The wheel 39 carries a gear-wheel segment 40 through which the spindle 36 extends and which segment has circumferential teeth which constantly mesh with a gear wheel 42 which is rotatable on a spindle 41. The gear wheel 42 can be driven by means of a gear rack 43, which in its turn can be driven selectively in one of two opposite directions of movement by a drive motor via a gear mechanism. The drive motor and the gear mechanism are irrelevant to the present invention and are therefore not shown. In the "fast forward" and "fast reverse" modes the gear rack 43, the gear wheel 42, the gear-wheel segment 40, the wheel 39, the switching wheel 37 and the second pulley 35 occupy the positions shown in FIG. 3. By moving the gear rack 43 in the direction indicated by the arrow 44 the gear-wheel segment 40 and the wheel 39 are rotated in the direction indicated by the arrow 45 via the gear wheel 42, so that the second pulley 35 and the switching gear wheel 37 are pivoted until the switching wheel 37 meshes with a first drive wheel 46 of the drive mechanism 15, after which the drive motor is switched off automatically. The switching wheel 37 occupies this position in the "normal forward" and "reverse" modes. Thus, in the "normal forward" and "reverse" modes the first drive wheel 46 can be driven selectively in one of two directions of rotation corresponding to the selected direction of rotation of the motor 32 via the switching wheel 37 and the belt drive 33, 34, 35. For energizing the motor 32 and reversing its direction of rotation this motor may be arranged in a diagonal branch of a conventional bridge arrangement comprising four transistors as is known, for example, from U.S. Pat. No. 3,293,522. It is also possible to employ a motor which rotates in only one direction of rotation and which drives the switching wheel 37 and hence the first drive wheel 46 via a gear mechanism, the direction of rotation being reversed by this gear mechanism to drive the drive wheel 46 selectively in one of the two directions of rotation.

Figure 4:
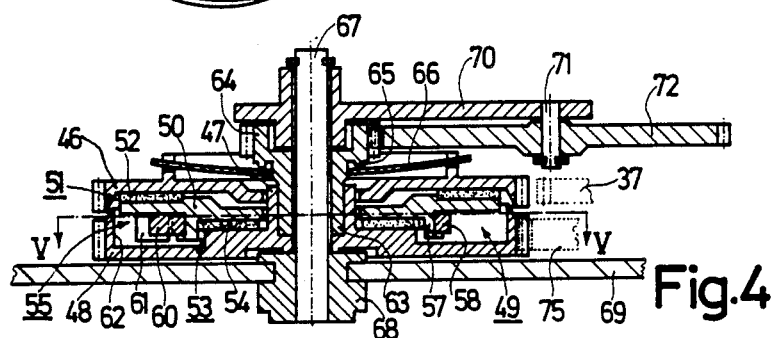
FIG. 4 is a sectional view taken on the line IV—IV in FIG. 3.

As can be seen in FIG. 4 the first drive wheel 46 is mounted for rotation on a tubular sleeve 47 formed on a second drive wheel 48. In this way the two drive wheels are mounted to be coaxial with and rotatable relative to each other. A coupling device 49, which is shown schematically in FIG. 3, is arranged between the two drive wheels 46 and 48, enabling the second drive wheel 48 to be driven by the first drive wheel 46 in the "normal forward" and "reverse" modes.

The coupling device 49 comprises an idler wheel 50 which is arranged coaxially between the two drive wheels 46 and 48, which is rotatable relative to these drive wheels, and which is also mounted for rotation on the sleeve 47. By means of a first friction coupling 51 the first drive wheel 46 is coupled to the idler wheel 50. The friction coupling 51 is a felt-disc coupling comprising an annular felt disc 52 glued to the idler wheel. In its turn the idler wheel 50 is coupled to the second drive wheel 48 via a second friction coupling 53. The second friction coupling 53 is also a felt-disc coupling comprising an annular felt disc 54 glued to the idler wheel. The annular felt discs 52 and 54 of the two felt-disc couplings 51 and 53 are made of the same felt material and have different outer and inner diameters. Thus, the two annular felt discs 52 and 54 have different average diameters, the average diameter being a measure of the maximum torque that can be transmitted. In this way the two friction couplings 51 and 53 of the coupling device 49 are constructed to transmit different torques, the ratio between the diameters in the present case being such that the friction coupling 51 transmits the larger torque and the friction coupling 53 transmits the smaller torque.

Figure 5:
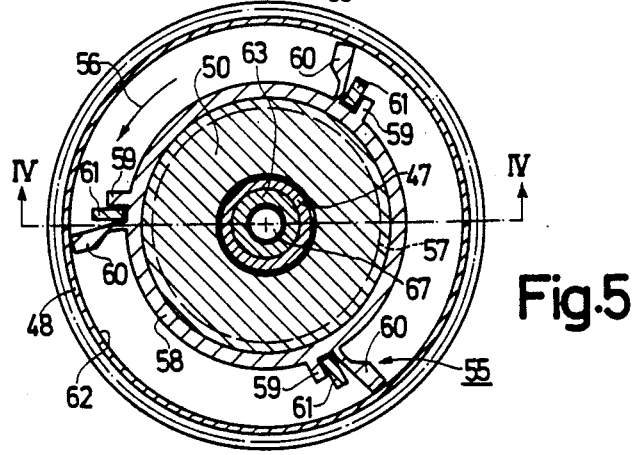
FIG. 5 shows a unidirectional coupling of the coupling device in a sectional view taken on the line V—V in FIG. 4.

The coupling device 49 includes a unidirectional coupling 55 by means of which in one of the two directions of rotation of the first drive wheel 46 and consequently of the entire coupling device 49, in the present case the anticlockwise direction as indicated by the arrow 56 in FIG. 5, the second driven wheel 48 can be rigidly coupled to the idler wheel 50 so as to bypass said friction coupling 53. The unidirectional coupling 55 is a clamping body freewheel coupling which circumferentially embraces the felt-disc coupling 53 for the smaller torque. This freewheel coupling includes an annular body 58 of an elastic material, such as rubber, arranged on an annular ridge 57 on the idler wheel 50, and three equi-spaced pairs of short projections 59 and long projections 60 which extend from this body in radial directions. A limb 61 on the idler wheel 50 projects in an axial direction towards the second drive wheel 48 between each pair of projections 59 and 60 to lock the annular body 58 against rotation. The long projections 60 constitute the pivotable clamping jaws of the freewheel coupling. The free ends extend up to a circumferential inner bounding wall 62 of the second drive wheel 48 and are pivotable in circumferential directions. If the idle wheel 50 is driven clockwise in a direction opposite to that indicated by the arrow 56, the long projections 60 deflect as shown and their free ends slide over the bounding wall 62 without establishing a coupling between the idler wheel 50 and the second drive wheel 48. However, if the idler wheel 50 is driven anticlockwise in the direction indicated by the arrow 56 the long projections 60 are straightened and abut against the limbs 61 on the idler wheel 50, so that their free ends are wedged against the bounding walls 62 of the second drive wheel 48, so that a coupling is established between the idler wheel 50 and the second drive wheel 48. It is obvious that instead of the freewheel coupling described above a clamping-roller freewheel coupling may be employed, in which the clamping bodies are constituted by rotatable rollers. By constructing the two friction couplings as felt-disc couplings and the unidirectional coupling as a clamping-body freewheel coupling which circumferentially embraces the felt-disc coupling which transmits the smaller torque a very compact coupling device is obtained, as will be apparent from FIG. 4.

By means of its integral sleeve 47 and a further sleeve 63, which is pressed into this sleeve 47, the second drive wheel 48 is rigidly connected to a gear wheel 64 on which the further sleeve 63 is formed. A two-armed blade spring 66, which is not shown in FIG. 3, bears against an annular protrusion 65 on the gear wheel 64, the arms of this spring bearing against the first drive wheel 46 and their spring force determining the torque which can be transmitted by the two friction couplings 51 and 53. The torques to be transmitted can be adjusted by providing abutments for the spring arms of the blade spring 66 at different axial levels on the first drive wheel 46. The second drive wheel 48 and the gear wheel 64 which is rigidly connected thereto are mounted for rotation on a spindle 67 which is secured to a deck plate 69 by means of a bush 68. Further, a lever 70 is pivotally mounted on the free end of the spindle 67 and carries a spindle 71 on which a drive wheel 72, which is constantly in mesh with the gear wheel 64, is rotatable journalled. Depending on the direction of rotation of the gear wheel 64 the drive wheel 72, which is in mesh with the gear wheel 64, is automatically pivoted in opposite directions as a result of the inertial and frictional forces, in such a way that this wheel comes into mesh with one of the two reel supports 16 and 17, which are also constructed as gear wheels. Thus, depending on its direction of rotation the second drive wheel 48 can be coupled to one of the two winding spindles 13 and 14 via the gear wheel 64, the drive wheel 72 and one of the two reel supports 16 and 17.

In the position of the switching wheel 37 shown in FIG. 3, which it occupies in the "fast forward" and "fast reverse" modes, this wheel is in mesh with a first intermediate gear wheel 73 which is rotationally coupled to a second intermediate gear wheel 75 by a spindle 74. The second intermediate gear wheel 75 is constantly in mesh with the second drive wheel 48, so that in the "fast forward" and "fast reverse" modes the second drive wheel 48 can be driven directly by the switching wheel 37 via the two intermediate wheels 73 and 75 and the first drive wheel 46 and the coupling device 49 are byassed.

In the "normal forward" mode switching wheel 37 is not engaged with wheel 73 but is in mesh with the first drive wheel 46. The first pulley 33 is then driven in an anticlockwise direction with a predetermined speed by the motor 32, and via the belt 34, the second pulley 35 and the switching wheel 37 this rotation is transmitted to the first drive wheel 46, which then rotates in a clockwise direction. The first drive wheel 46 drives the idler wheel 50 via the first friction coupling 51 and this idler wheel drives the second drive wheel 48 via the second friction coupling 53, the unidirectional coupling 55 being inoperative. In this case the friction coupling 53 for the smaller torque will slip and the other friction coupling 51 for the larger torque behaves as a rigid coupling. Thus, the torque being transmitted is determined by the friction coupling 53 for the smaller torque and is consequently smaller. The torque transmitted to the second drive wheel 48 is transmitted to the gear wheel 64 via the sleeve 47 and the sleeve 63 and from this gear wheel 64 to the drive wheel 72, which then rotates anticlockwise. As a result of this rotation, the drive wheel 72 is automatically pivoted towards the reel support 17 and meshes with this support 17, so that this reel support and consequently the winding spindle 14 and the winding hub 10 are driven in conformity with the smaller torque transmitted by the friction coupling 53.

In the "reverse" mode the motor 32 drives the first pulley 33 with the same speed as in the "normal forward" mode, but in the clockwise direction, and via the belt 34, the second pulley 35 and the switching wheel 37 this rotation is transmitted to the first drive wheel 46, which then rotates in the anticlockwise direction. The idler wheel 50 is driven by the first drive wheel 46 via the first friction coupling 51. The unidirectional coupling 55 is then rendered operative to establish a rigid coupling between the idler wheel 50 and the second drive wheel 48. The friction coupling 51 for the larger torque then slips, so that the torque being transmitted is governed by this friction coupling and is consequently larger. The larger torque transmitted to the second drive wheel 48 is transmitted from this drive wheel to the gear wheel 64 via the sleeve 47 and the sleeve 63 and from the gear wheel 64 to the drive wheel 72, which then rotates in the clockwise direction and is automatically brought into mesh with the reel support 16 to drive this reel support. In this way the winding spindle 13, and consequently the winding hub 9, is driven in conformity with the larger torque transmitted by the friction coupling 51.

Thus, the drive mechanism 15, comprising a single coupling device 49 for driving the two winding spindles 13 and 14 in the "normal forward" and "reverse" modes, enables the winding spindle 14 to be driven with a smaller torque and the winding spindle 13 with a larger torque in simple way. Allowance is thus made for the different friction effects on the magnetic tape in the "normal forward" and "reverse" modes, thereby ensuring that in both modes of operation the winding spindles are selectively driven with such a torque the magnetic tape is wound correctly onto the winding hubs driven by the winding spindles and with a minimal power.

In the "fast forward" mode the first pulley 33 is driven in the clockwise direction by the motor 32 in the same way as in the "reverse" mode but with a higher speed. By means of the belt 34 and the second pulley 35 this rotation is transmitted to the switching wheel 37 and hence directly to the second drive wheel 48 via the first intermediate wheel 73 and the second intermediate wheel 75 and from this drive wheel 48 to the gear wheel 64 via the sleeve 47 and the sleeve 63 and then to the drive wheel 72, which then rotates anticlockwise and therefore meshes with the reel support 17 to drive this reel support with a higher speed. In the "fast reverse" mode the direction of rotation of the motor 32 is reversed in comparison with that in the "fast forward" mode, so that the drive wheel 72 is driven in the clockwise direction via the same transmission as in the "fast forward" mode, causing it to mesh with the reel support 16 to drive this reel support with a higher speed. In the "fast forward" and "fast reverse" modes the two winding spindles 13 and 14 are driven with the same torque determined by the motor.

It is obvious that several modifications are possible within the scope of the present invention. For example, the friction coupling and the unidirectional coupling may each be constructed as a torsion spring coupling. Alternatively, the unidirectional coupling may be a ratchet coupling. Moreover, the selective engagement of the drive wheel with the reel support need not be effected automatically depending on the direction of rotation of these reel supports but may be effected directly by means of a further drive motor or by means of actuating buttons.

What is claimed is:

1. A record and/or reproducing apparatus for a record carrier in the form of a tape comprises
    two rotatable winding spindles for driving two winding hubs which are coaxially mounted on respective spindles, said hubs taking up the tape in conformity with a direction of transport selected from two possible directions of transport,
    a drive mechanism for driving the winding spindles, said mechanism comprising a first drive wheel which can be driven in one of two directions of rotation, and a second drive wheel which is rotatable relative to and coaxial with the first drive wheel,
    a coupling device for rotation of the second drive wheel by the first drive wheel, said coupling device comprising first and second friction couplings to drive one of the two winding spindles depending upon the direction of transport, said first friction coupling being capable of transmitting more torque than the second friction coupling, said device further comprising an idler wheel arranged coaxially between the first and second drive wheels so as to be rotatable relative to said drive wheels, the first drive wheel being coupled to the idler wheel by the first friction coupling, the second drive wheel being coupled to the idler wheel by the second friction coupling, said device further comprising a unidirectional coupling having means for rigidly coupling the second drive wheel to the idler wheel for one of the two directions of rotation of the first drive wheel, whereby the second friction coupling is bypassed.

2. An apparatus as in claim 1 wherein each of the first and second friction couplings is constituted by a felt-disc coupling comprising an annular felt disc and the unidirectional coupling is constituted by a clamping-body freewheel coupling which embraces the circumference of second friction coupling.

3. An apparatus as in claim 2 wherein the annular felt discs of the two felt-disc couplings are made of the same felt material and have at least different outer diameters or inner diameters.

* * * * *